(12) United States Patent
Vasseur et al.

(10) Patent No.: US 11,539,673 B2
(45) Date of Patent: Dec. 27, 2022

(54) PREDICTIVE SECURE ACCESS SERVICE EDGE

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 17/308,238

(22) Filed: May 5, 2021

(65) Prior Publication Data

US 2022/0360567 A1 Nov. 10, 2022

(51) Int. Cl.
*H04L 9/40* (2022.01)
*H04L 67/10* (2022.01)
*H04L 41/147* (2022.01)
*H04L 43/12* (2022.01)
*G06N 20/00* (2019.01)
*G06N 5/04* (2006.01)
*H04L 12/46* (2006.01)

(52) U.S. Cl.
CPC .......... *H04L 63/0281* (2013.01); *G06N 5/04* (2013.01); *G06N 20/00* (2019.01); *H04L 12/4633* (2013.01); *H04L 41/147* (2013.01); *H04L 43/12* (2013.01); *H04L 63/029* (2013.01); *H04L 63/166* (2013.01); *H04L 67/10* (2013.01); *H04L 63/0272* (2013.01)

(58) Field of Classification Search
None
See application file for complete search history.

(56) References Cited

U.S. PATENT DOCUMENTS

| 9,401,851 | B2 | 7/2016 | Kakadia et al. |
| 10,652,126 | B2 | 5/2020 | Sadana et al. |
| 11,368,489 | B2 * | 6/2022 | Adam ................. H04L 63/1416 |
| 11,398,958 | B2 * | 7/2022 | Vasseur ............... H04L 41/5022 |

(Continued)

OTHER PUBLICATIONS

"Understanding Performance Routing", Performance Routing Configuration Guide, Cisco IOS Release 15S, Jan. 26, 2018, 34 pages, Cisco Systems, Inc.

(Continued)

*Primary Examiner* — Quang N Nguyen
(74) *Attorney, Agent, or Firm* — Behmke Innovation Group; Kenneth J. Heywood; Jonathon P. Western

(57) ABSTRACT

In one embodiment, a device obtains telemetry data that results from an edge router sending probes to a cloud-hosted application via a plurality of points of presence. The device makes, based on the telemetry data, predictions as to whether use of each of the plurality of points of presence by the edge router to access the cloud-hosted application will result in a violation of a service level agreement. The device selects, based on the predictions, a particular point of presence from among the plurality of points of presence that the edge router should use to access the cloud-hosted application during a time window. The device causes the edge router to access the cloud-hosted application via the particular point of presence during the time window.

18 Claims, 11 Drawing Sheets

(56) References Cited

U.S. PATENT DOCUMENTS

| | | |
|---|---|---|
| 2019/0386918 A1 | 12/2019 | Iyer et al. |
| 2020/0084152 A1 | 3/2020 | Zhang et al. |
| 2020/0167258 A1* | 5/2020 | Chattopadhyay ........ G06N 3/08 |
| 2020/0382402 A1* | 12/2020 | Kolar ...................... H04L 43/12 |
| 2022/0060393 A1* | 2/2022 | Vasseur ................... H04L 45/30 |
| 2022/0070086 A1* | 3/2022 | Mermoud ............. H04L 41/147 |
| 2022/0116286 A1* | 4/2022 | Doshi ................. H04L 41/5032 |
| 2022/0231939 A1* | 7/2022 | Mermoud ............... H04L 45/22 |

OTHER PUBLICATIONS

Mehta, Anishi, "Time-Series Analysis of Internet Congestion Data", online: https://arxiv.org/pdf/1812.04991.pdf, Nov. 2018, 4 pages.

"Cisco Performance Routing", Data Sheet, C-78-424310-02, Jul. 2010, 10 pages, Cisco Systems, Inc.

Roughan, et al., "Combining Routing and Traffic Data for Detection of IP Forwarding Anomalies", Proceedings of the International Conference on Measurements and Modeling of Computer Systems, SIGMETRICS 2004, Jun. 10-14, 2004, 13 pages, ACM.

Millan, et al. "Time Series Analysis to Predict End-to-End Quality of Wireless Community Networks", May 25, 2019, 23 pages, Electronics, MDPI.com.

\* cited by examiner

PREDICTIVE SECURE ACCESS SERVICE EDGE

TECHNICAL FIELD

The present disclosure relates generally to computer networks, and, more particularly, to a predictive secure access service edge.

BACKGROUND

Secure Access Service Edge (SASE) has emerged in the past few years as an important trend and concept in security and networking. In general, SASE is a network architecture whereby WAN and security are provided jointly as a service, through the use of secure gateways that combine WAN access and cloud-delivered firewalls and security. The overall intent of a SASE is to simplify the network architecture, by connecting all locations to a SASE gateway managed by a provider, such as Cisco Umbrella by Cisco Systems, Inc. The SASE gateway is then responsible for all security policies, as well as for providing WAN connectivity.

The SASE model is attractive in that it offers a simplified architecture. However, it does not come without challenges. For instance, the closest point of presence (PoP) of the SASE provider is often selected based on its location and proximity to the edge device connecting to it, under the assumption that this PoP offers the best performance, which is not always the case. Indeed, performance of PoP used to access a cloud-hosted application can change over time, leading to decreased performance and lowered quality of experience for the user.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
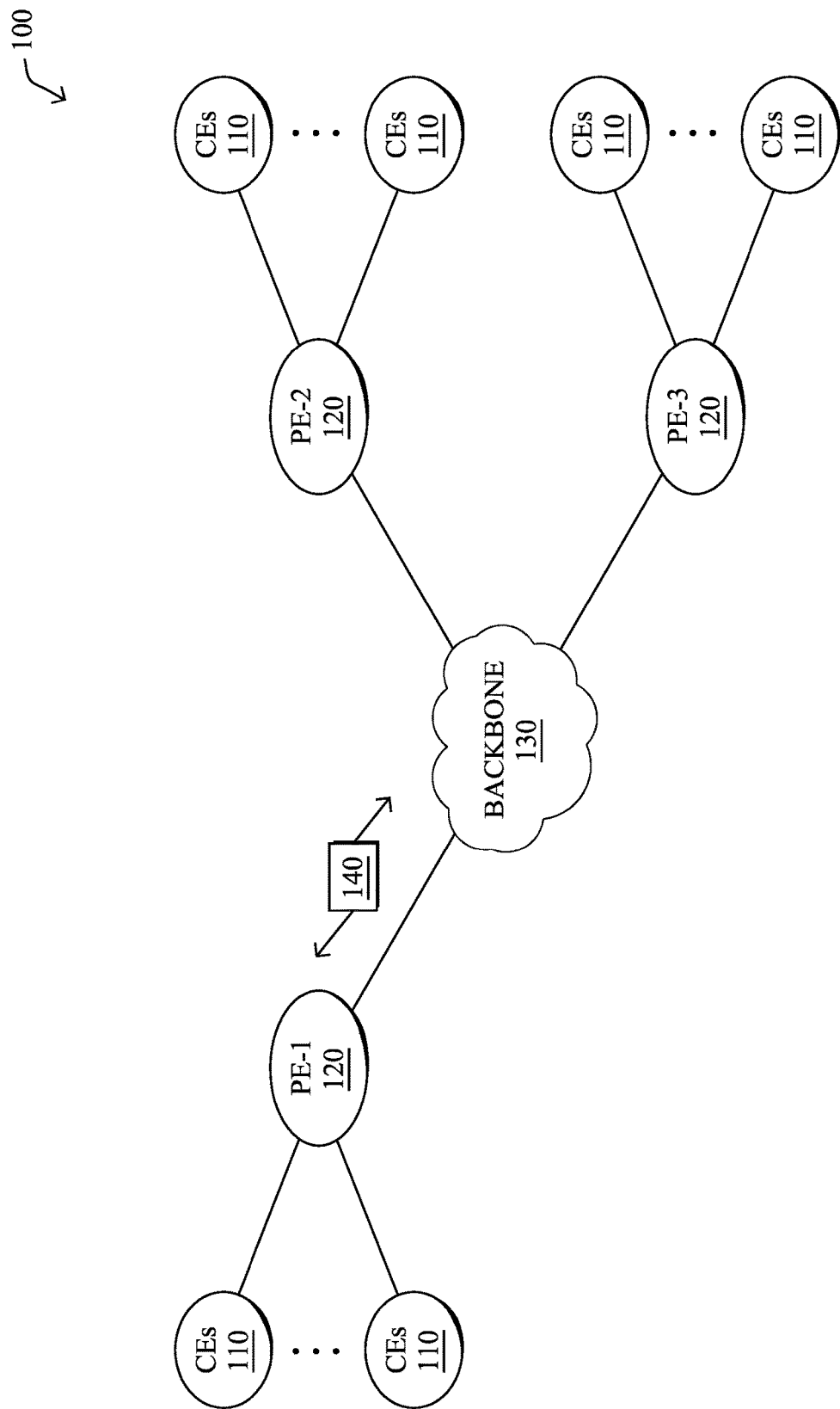
FIGS. 1A-1B illustrate an example communication network.

According to one or more embodiments of the disclosure, a device obtains telemetry data that results from an edge router sending probes to a cloud-hosted application via a plurality of points of presence. The device makes, based on the telemetry data, predictions as to whether use of each of the plurality of points of presence by the edge router to access the cloud-hosted application will result in a violation of a service level agreement. The device selects, based on the predictions, a particular point of presence from among the plurality of points of presence that the edge router should use to access the cloud-hosted application during a time window. The device causes the edge router to access the cloud-hosted application via the particular point of presence during the time window.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/ 5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/ LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
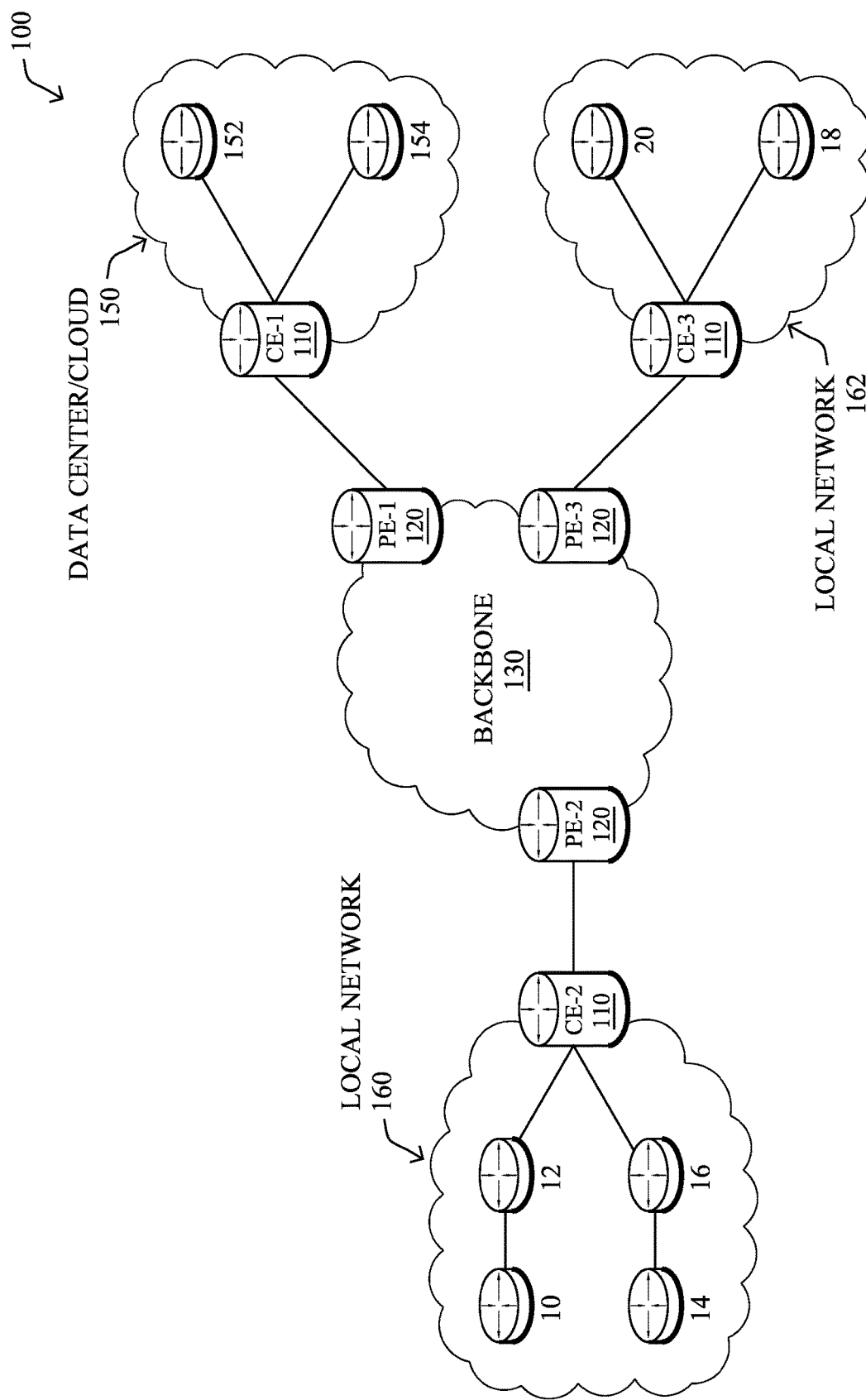

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
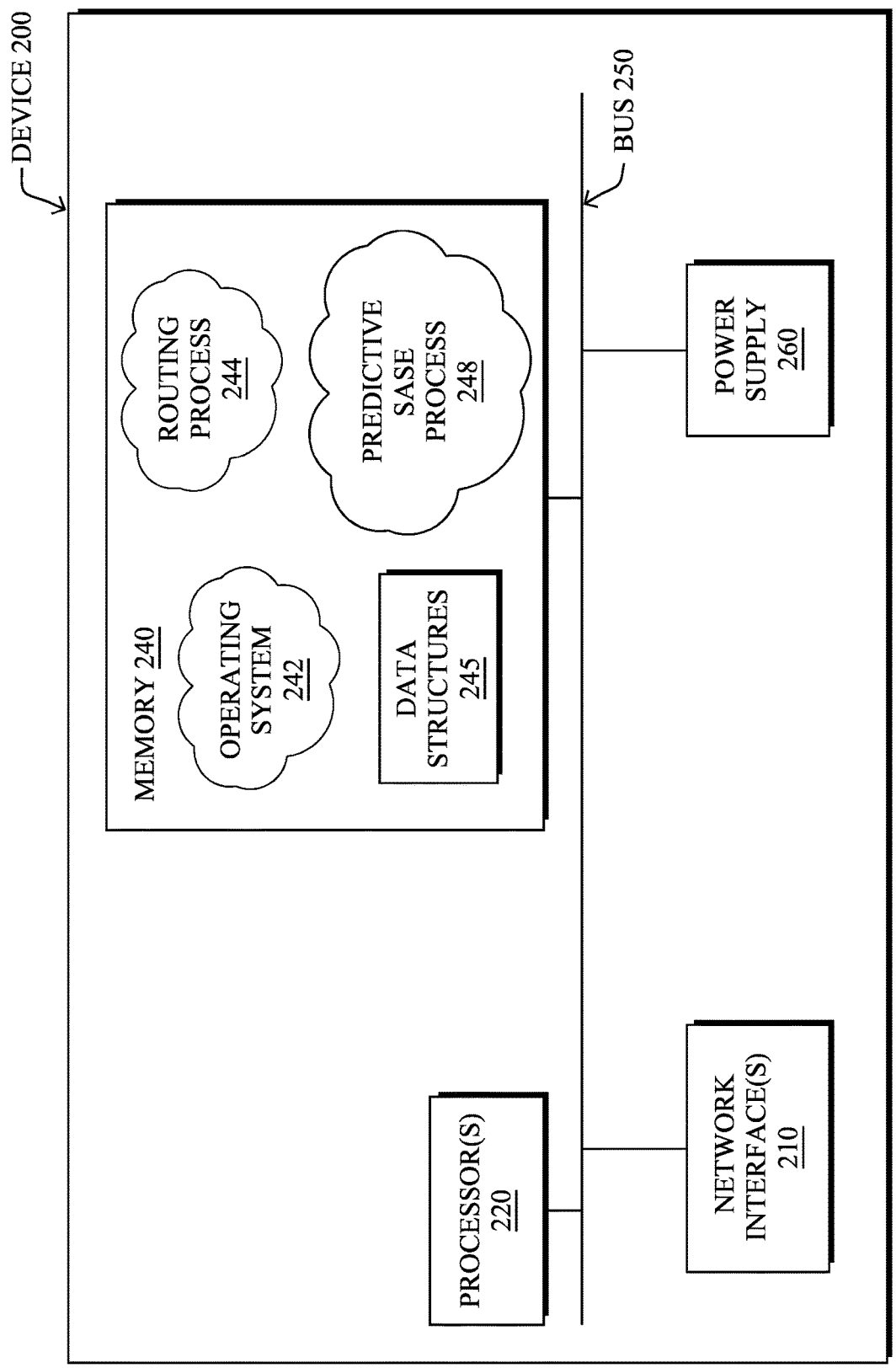
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242

(e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a predictive Secure Access Service Edge (SASE) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or predictive SASE process 248 may also include computer executable instructions that, when executed by processor(s) 220, cause device 200 to perform the techniques described herein. To do so, in some embodiments, routing process 244 and/or predictive SASE process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or predictive SASE process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or predictive SASE process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
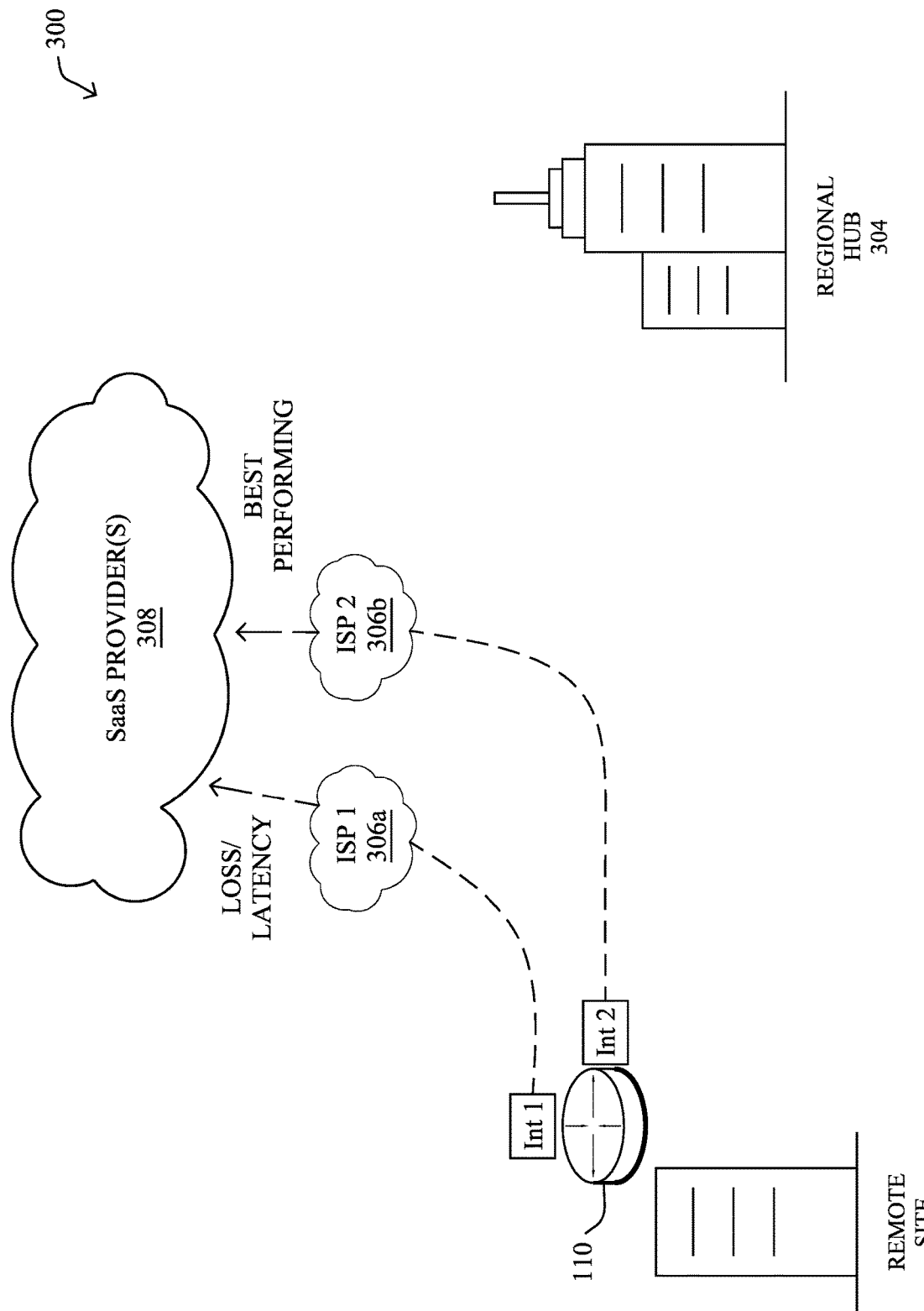
FIGS. 3A-3B illustrate example network deployments.
Figure 3B:
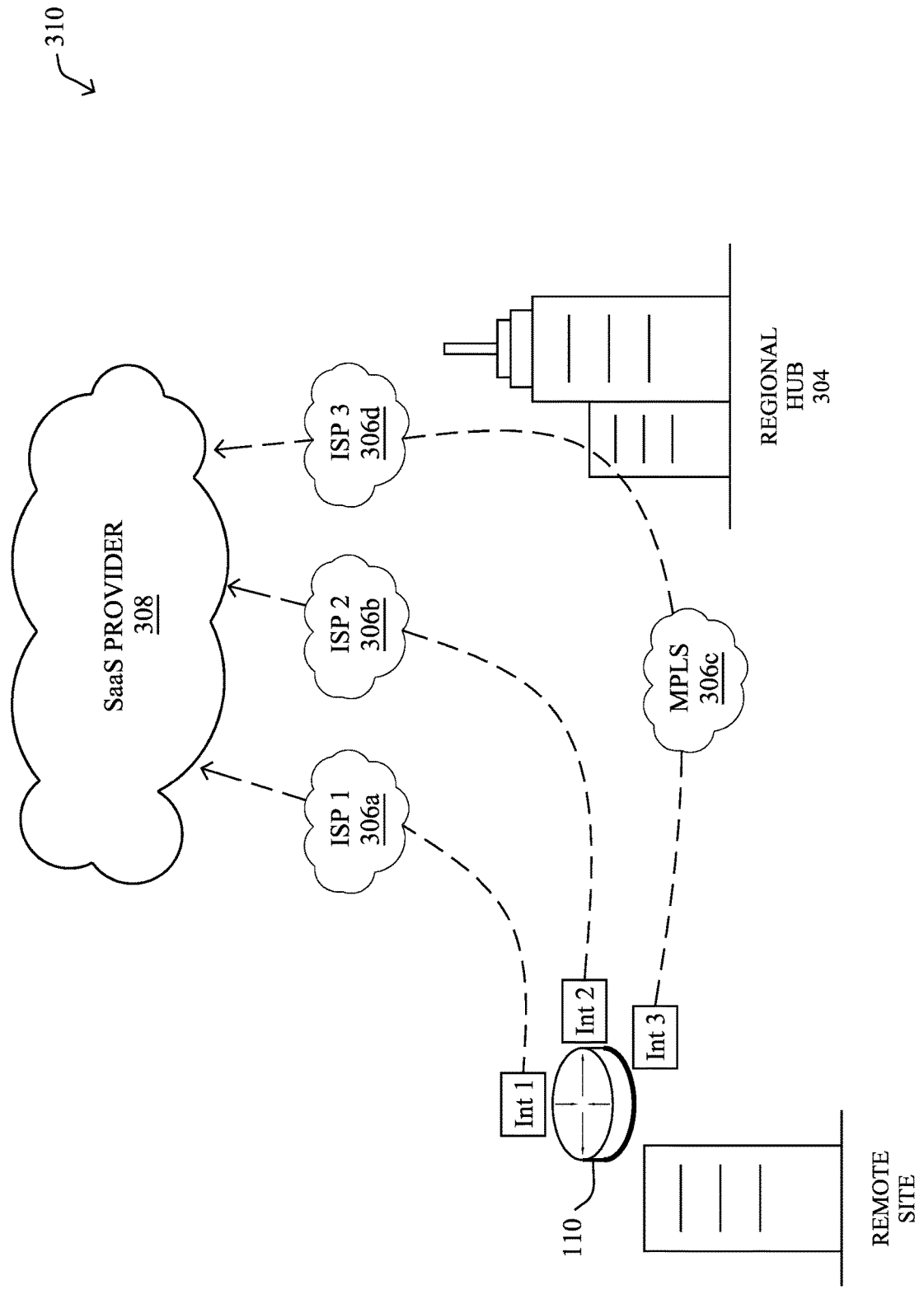

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider (s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
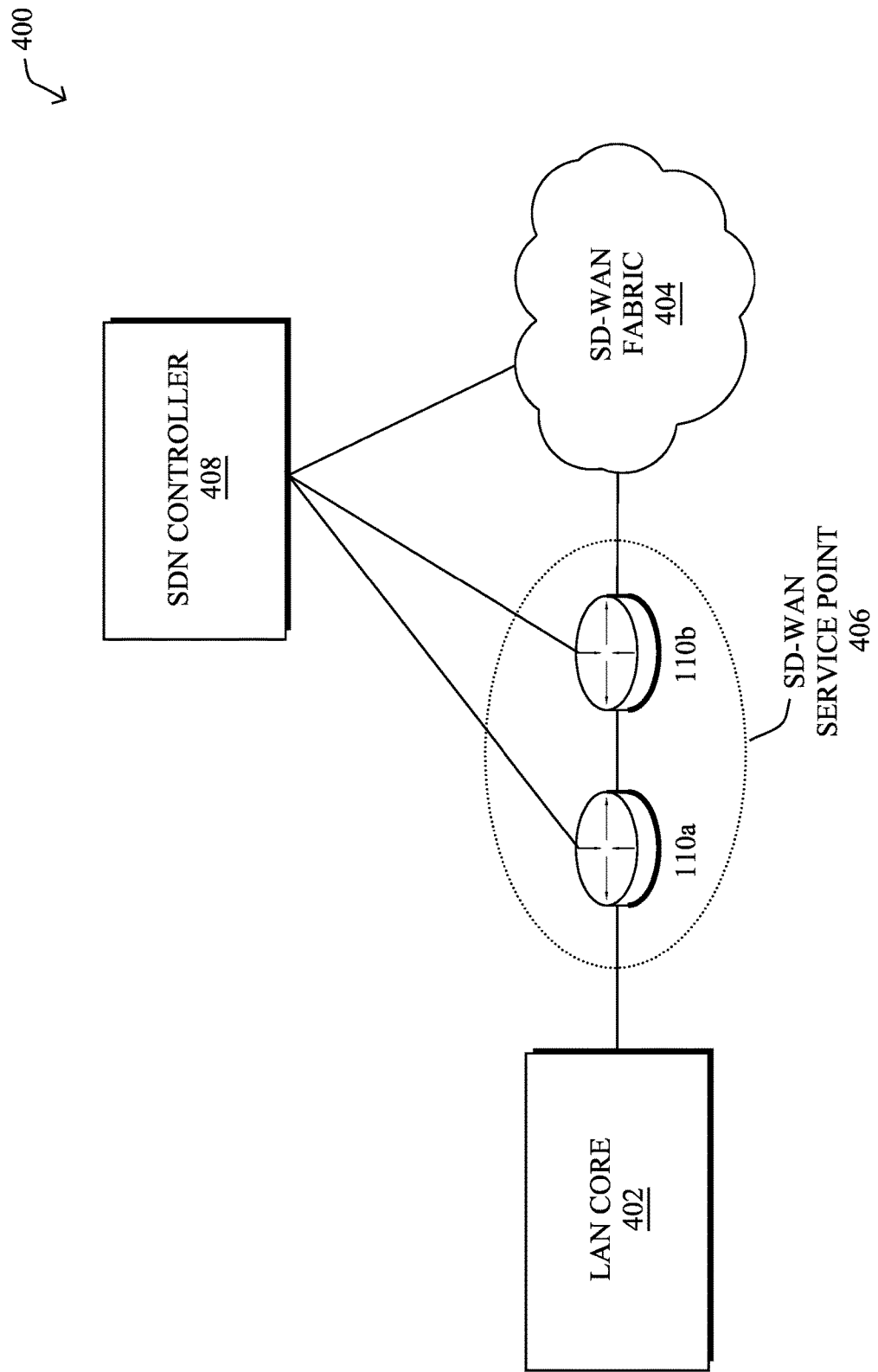
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of could be avoided (e.g., using an alternate path), if predicted in advance.

Figure 4B:
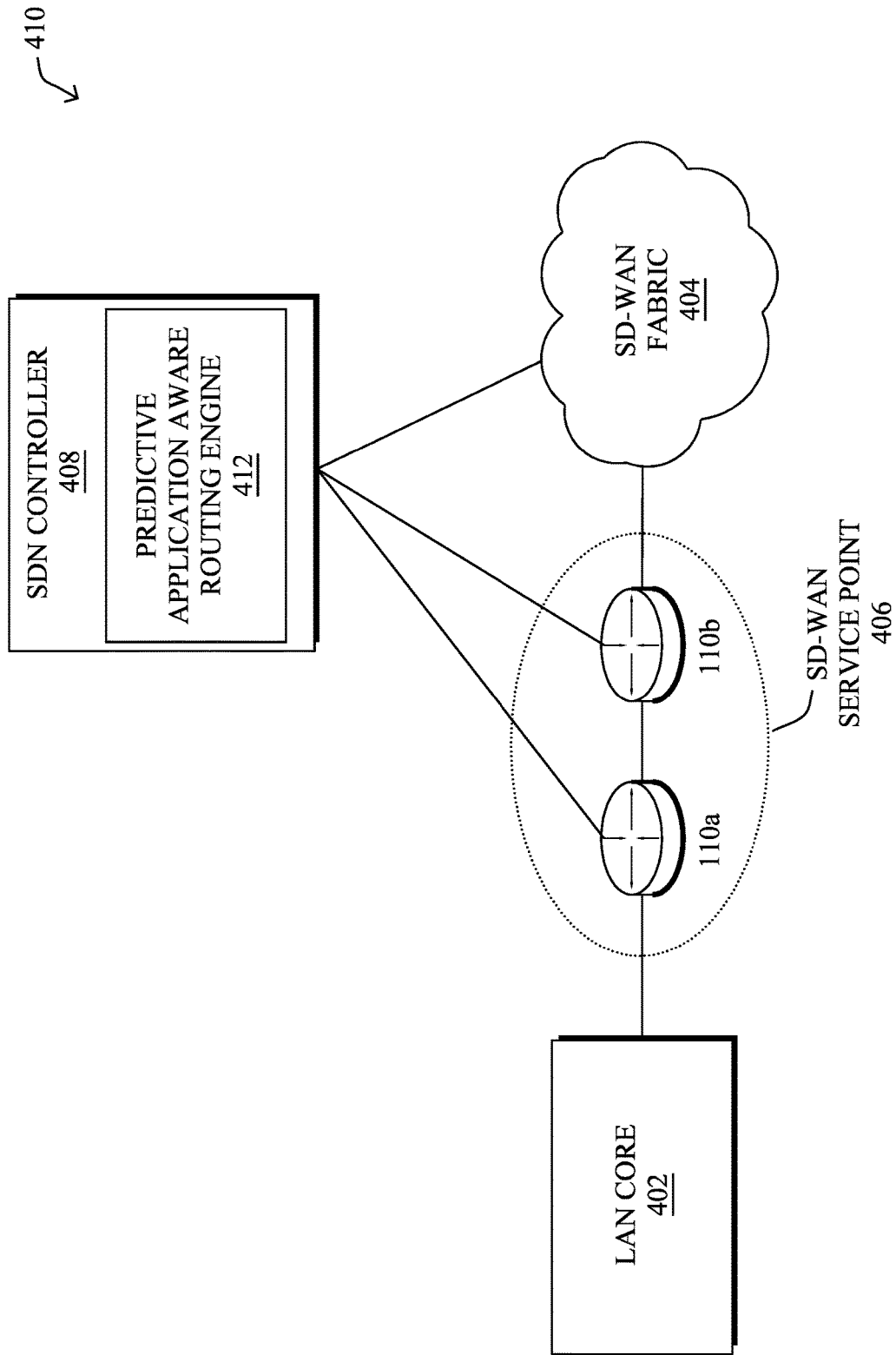

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or predictive SASE process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, Secure Access Service Edge (SASE) has emerged in the past few years as an important trend and concept in security and networking. In general, SASE is a network architecture whereby WAN and security are provided jointly as a service, through the use of secure gateways that combine WAN access and cloud-delivered firewalls and security. The overall intent of a SASE is to simplify the network architecture, by connecting all locations to a SASE gateway managed by a provider, such as Cisco Umbrella by Cisco Systems, Inc. The SASE gateway is then responsible for all security policies, as well as for providing WAN connectivity.

SASE providers host their gateways in points of presence (Pas) around the world, and locations are usually connected to the closest PoP, either in purely geographical terms, or in terms of routing topology using AnyCast. To do so, the location typically establishes a simple, unique, and secure tunnel to the corresponding PoP, and all traffic is sent to the provider.

Figure 5:
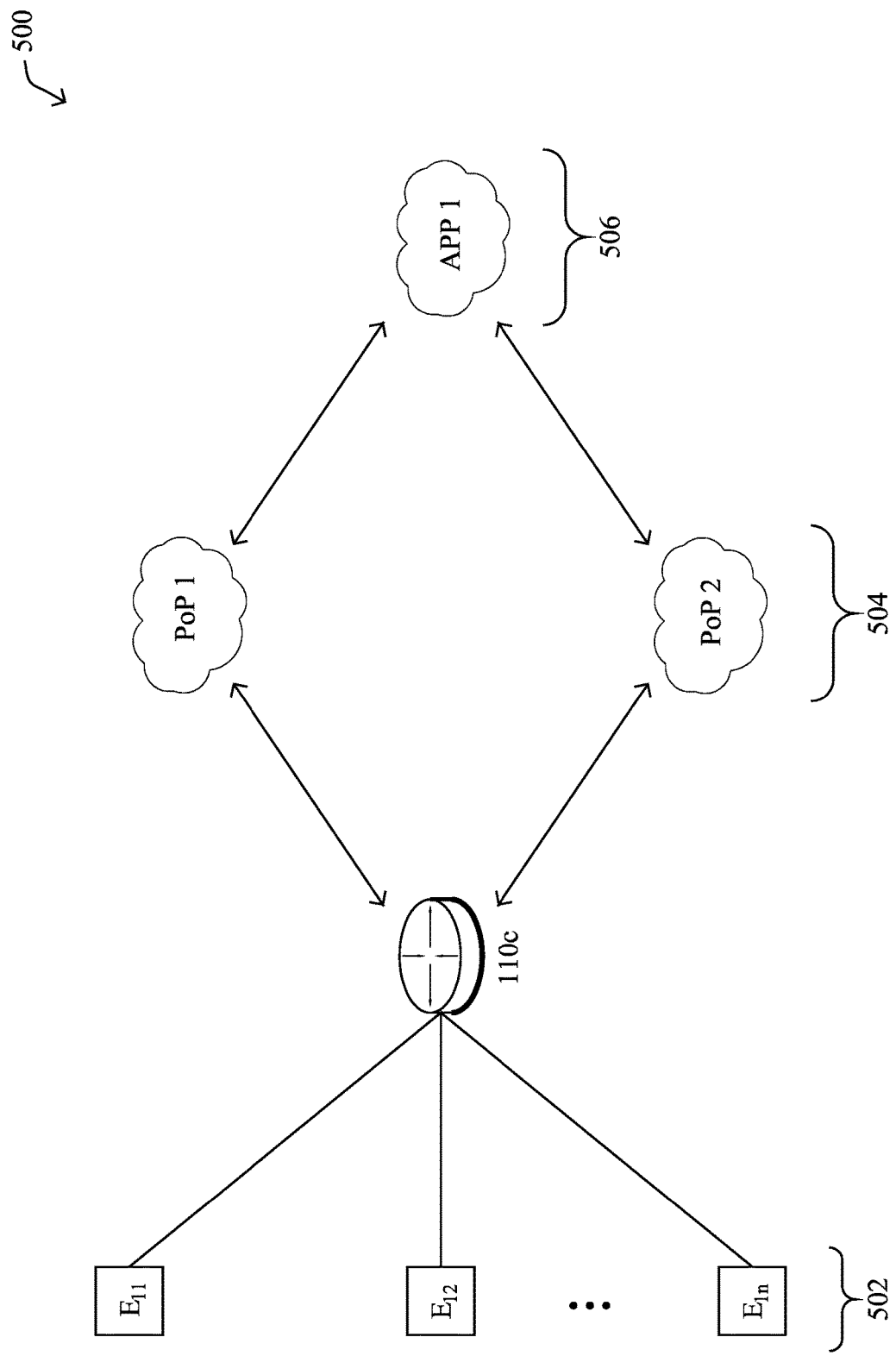
FIG. 5 illustrates an example of an edge router connecting to a cloud-hosted application via multiple points of presence (PoPs)

FIG. 5 illustrates an example 500 of an edge router 110c accessing a cloud-hosted application 506. As shown, assume that there are n-number of endpoints 502 at a particular location for which edge router 110c provides external connectivity. Under a SASE model, a SASE provider may maintain any number of PoPs 504 to which edge router 110c may connect. Accordingly, edge router 110c may access a cloud-hosted application 506, such as an SaaS application, via a first PoP among PoPs 504, a second PoP among PoPs 504, etc.

Although SASE is an attractive model, there are practical challenges. The benefits of SASE usually only focus on security and simplicity of use, while performance is not guaranteed. Indeed, ensuring that traffic SLAs are met may require adjustments that decrease the value of the SASE model:

- To meet SLAs, exceptions might be required for traffic that should not be sent through the gateway but directly sent via Direct Internet Access (DIA) locally, in case the gateway is not able to provide a good enough performance for a specific kind of traffic, which highly depends on Peering between the SASE Gateway PoP and SaaS provider or intermediate Autonomous Systems (AS). For instance, it is sometimes recommended to send out VoIP traffic directly DIA to achieve better performance. However, this defeats the purpose of delivering WAN and security directly in the cloud while relying only on a very simple unique tunnel from all locations.
- Selection of the "closest PoP" is usually based on either geo-location, AnyCast (e.g., for secure web gateways relying on HTTPS proxies), or by fixing a static PoP location (e.g., as is usually done when setting up fixed IPsec tunnels). However, SASE providers tend to have rather dense sets of PoPs to which a location can connect. Thus, the closest PoP is not always the best one to use. In particular, a PoP might be struggling at certain times of the day to satisfy the SLA of the application traffic, while other nearby PoPs might not.

The performance of a given PoP can also vary between applications. Indeed, performance can be influenced by any or all of the following factors:

Edge to PoP.
PoP load.
PoP to PoP, if traffic is sent through a backbone.
PoP to SaaS. Different PoPs might have different types of inter-connect or peering with SaaS services, and might end up going to different SaaS physical endpoints, even if the SaaS exposes a single logical endpoint.

Predictive Secure Access Service Edge

The techniques introduced herein help to select the PoP that an edge device should use to access a cloud-hosted application, so as to ensure that the SLA of the application traffic is met. In various embodiments, this selection can be made in a predictive manner and dynamically, such that different PoPs may be used at different times and/or under different conditions. In further embodiments, the techniques herein also allow for the selection of the best tunnel to use for the traffic coming back from the PoP network to the edge device.

Illustratively, the techniques described herein may be performed by hardware, software, and/or firmware, such as in accordance with predictive SASE process 248, which may include computer executable instructions executed by the processor 220 (or independent processor of interfaces 210) to perform functions relating to the techniques described herein (e.g., in conjunction with routing process 244).

Specifically, according to various embodiments, a device obtains telemetry data that results from an edge router sending probes to a cloud-hosted application via a is plurality of points of presence. The device makes, based on the telemetry data, predictions as to whether use of each of the plurality of points of presence by the edge router to access the cloud-hosted application will result in a violation of a service level agreement. The device selects, based on the predictions, a particular point of presence from among the plurality of points of presence that the edge router should use to access the cloud-hosted application during a time window. The device causes the edge router to access the cloud-hosted application via the particular point of presence during the time window.

Figure 6:
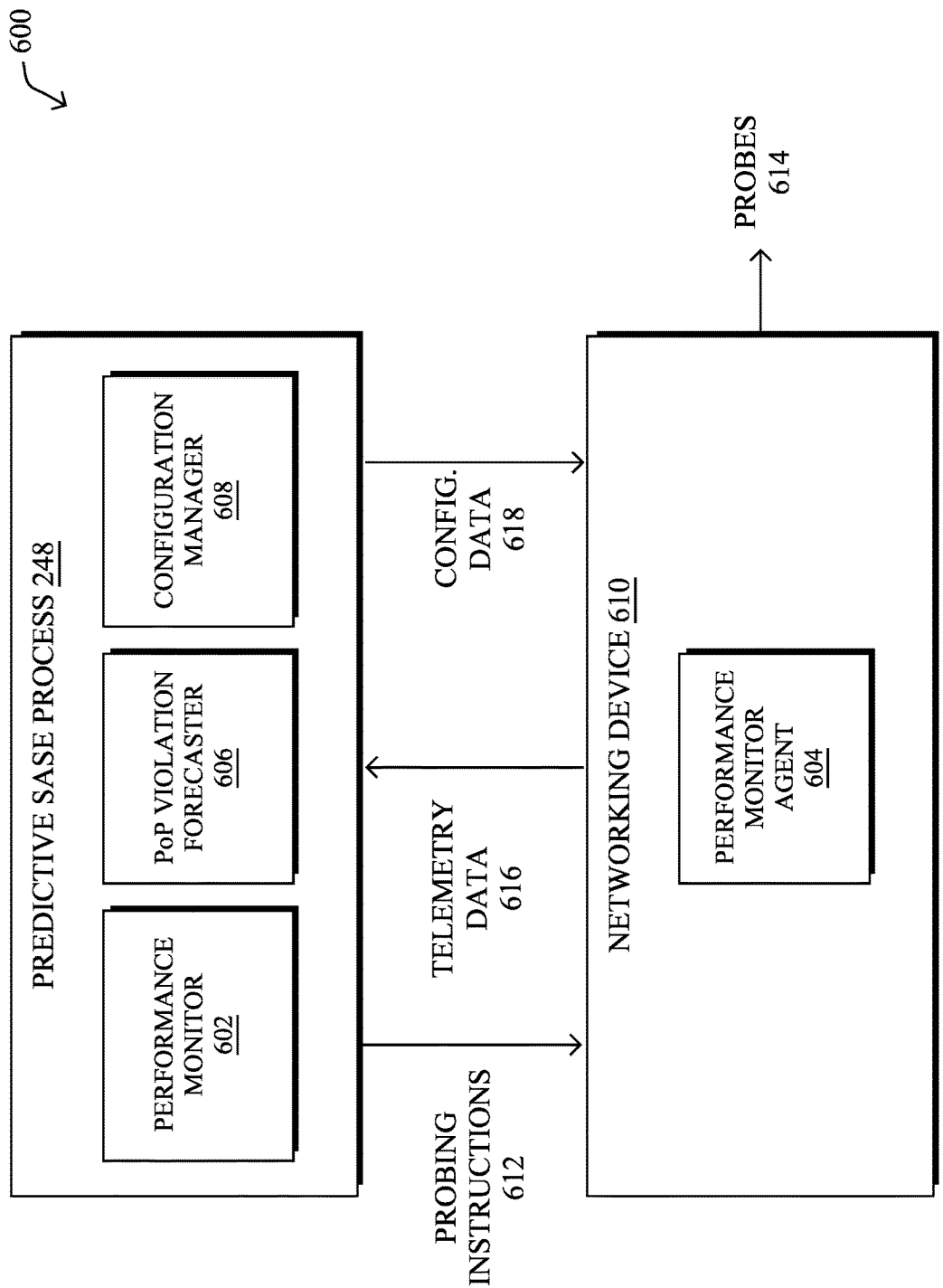
FIG. 6 illustrates an example architecture for a predictive Secure Access Service Edge (SASE) process.

Operationally, FIG. 6 illustrates an example architecture 600 for identifying and rectifying negative fate sharing among application traffic, according to various embodiments. At the core of architecture 600 is predictive SASE process 248, which may be executed by a controller for a network or another device in communication therewith. For instance, predictive SASE process 248 may be executed by a controller for a network (e.g., SDN controller 408 in FIGS. 4A-4B), a particular networking device in the network (e.g., a router, etc.), another device or service in communication therewith, or the like.

As shown, architecture 600 may include any or all of the following components: a performance monitor 602, a performance monitor agent 604, a PoP violation forecaster 606, and/or a configuration manager 608. As would be appreciated, the functionalities of these components may be combined or omitted, as desired. In addition, these components may be implemented on a singular device or in a distributed manner, in which case the combination of executing devices can be viewed as their own singular device for purposes of executing predictive SASE process 248.

In general, performance monitor 602 is a centralized component that orchestrates and centralizes the collection of probing telemetry data from network devices to SaaS services going through various PoPs of one or multiple SASE providers. More specifically, performance monitor 602 may be responsible for sending probing instructions 612 to a networking device 610 (e.g., an edge router, etc.) that causes networking device 610 to send probes 614 to the cloud-hosted application via different PoPs. In turn, networking device 610 may report telemetry data 616 back to predictive SASE process 248 indicative of the results of this probing.

Performance monitor 602 may be configured by listing SaaS endpoints and protocols of interest. In turn, performance monitor 602 may generate probing instructions 612, in accordance with the application of interest and the relevant protocols. For instance:

For REST APIs or services over HTTPS, such as Office 365, probing instructions 612 may indicate a uniform resource locator (URL) or a short scenario consisting in a few successive URLs to be fetch by networking device 610 (e.g., log in, list files in folder, download one)

For videoconferencing, voice, and similar applications, probing instructions 612 may instruct networking device 610 to probe by simulating a conference call or session. Simpler probes such as running a Session Initiation Protocol (SIP) session can also be used, and details depend on the service/application.

Performance monitor 602 may also determine a probing frequency at which networking device 610 (e.g., every hour, daily, etc.) should initiate probing. In addition, probing instructions 612 may also indicate any statistics or other metrics to be reported back via 616, such as statistics to capture: mean, standard deviation, specific percentile values etc.

In some embodiments, performance monitor 602 may also track, for each networking device, the list of PoPs that should be used for probing from each networking device. If required, performance monitor 602 may also interact with the SASE gateway service, to provision the required tunnels for probing in advance, if required. In particular, performance monitor 602 may track how a tunnel can be established:

In the simplest case, a regular ii'sec tunnel can be established.

When supported by the SASE gateway provider and when compatible with the probes (e.g., for HTTPS probes), the tunnel can more simply consist in a regular HTTPS request going through an HTTPS proxy (e.g., the Cisco Umbrella Secure Web Gateway or other such proxy). Using proxies is more lightweight than establishing a tunnel, especially when it is only for probing purposes. Proxies might not always reflect the performance of regular tunnels carrying traffic, and thus this measurement mode cannot always be used depending on the provider. In addition, if some probes cannot be accommodated by an HTTPS proxy (e.g., UDP SIP traffic for voice), then the network device still needs to establish a proper IPsec tunnel and there are no benefits to using a proxy for other probes.

In one embodiment, by default, the K-closest PoPs (e.g., 3 closest PoPs) for the device location can be used for purposes of this probing. Of course, this set can be adjusted later on, such as based on the results of the SLA violation predictions.

In various instances, probes 614 may be implemented using existing probing mechanisms in Viptela (e.g. HTTP probes to SaaS), a ThousandEyes agent, or the like. In another embodiment, there can be also be a warm-up period of, say, one week in which probes 614 are sent to larger number of PoPs. After the warm-up period, then a reduced set may be selected comprising the K-closest PoPs or all PoPs with SLA certain QoS conditions (e.g., loss <3%, latency <300 ms, jitter <10 ms).

Another component of architecture 600 is performance monitor agent 604, which runs on networking device 610 and is responsible for executing the probe configurations sent via probing instructions 612. To this end, performance monitor 602 may regularly send probing instructions 612 via a custom message to performance monitor agent 604, such as via the SD-WAN controller, other APIs, or the like, to set up the local probes and tunnels to test the various PoPs.

By way of example, probing instructions 612 may include a list of PoPs, configuration information to establish a tunnel to them (e.g., credentials or one time pads, to establish a secure tunnel), and probes that should be collected going through each of these PoPs. For instance, probing instructions 612 may indicate the following:

PoP 1, Paris, 210.1.1.1, IPsec, probes:
  SIP call
  HTTPS probe for SharePoint file download.
PoP 2, Frankfurt, 210.2.2.2, IPsec, probes:
  SIP call
  HTTPS probe for SharePoint file download.
PoP 3, London, 210.3.3.3, IPsec, probes:
  HTTPS probe for SharePoint file download.

In this e ample, the SIP call is only running through PoP1 and PoP2. This gives flexibility to the system to avoid collecting unnecessary probes. In practice, a simple embodiment is to collect the same probes going through all PoPs.

The resulting telemetry data 616 is then streamed back to performance monitor 602, such as via the SD-WAN controller, directly via APIs, or the like.

In various embodiments, another potential component of architecture 600 is PoP violation forecaster 606, which is responsible for training machine learning models to forecasts violations for a given network device and POP. In some instances, PoP violation forecaster 606 may be integrated into a predictive routing engine for the network, as used by an SDN controller. The predictions by PoP violation forecaster 606 are then used by configuration manager 608, to proactively avoid potential SLA violations. For instance, given networking device 610 and a predicted disruption while sending traffic through PoP 1, PoP violation forecaster 606 may suggest going through PoP 2 or PoP 3, instead, provided that no disruptions are predicted for them. These routing patches are then applied by pushing configuration data 618 (e.g., via the SD-WAN controller, directly, etc.).

PoP violation forecaster 606 may build models using the telemetry data 616 obtained by performance monitor 602. For each application, network device and eligible PoP for which enough data has been collected, PoP violation forecaster 606 may train a model to predict the probability of SLA violation for one or more future time windows.

In one embodiment, 606 may build its models using two-level feature construction as follows:

For a given PoP, aggregate features about the PoP are obtained using probes from all corresponding networking devices. Features can be built both cross-application (e.g., mixing up latencies from various applications), or by application. In one embodiment, PoP violation forecaster 606 may only use telemetry data associated with a particular entity from other devices of the same business, school, etc., probing the same PoP). In another embodiment, data from all various entities or locations connecting to the PoPs can be fused together and used.

For a given network device, and PoP, similar features specific to the network device may be built.

For a given network device and Poi', features thus include both device-specific information and more general information about the PoP as seen from potentially multiple vantage points. The former allows to capture potential violations specific to the network segment between the device and the PoP, while the latter allows PoP violation forecaster 606 to capture violations specific to the PoP and the network segment between the PoP and the target SaaS service/cloud-hosted application.

Any forecasting machine learning model can be used (e.g., regression, quantile regression, with linear models or richer function spaces). For instance, long-range models can be used to account for holidays, special business days, and long-term recurring events.

Figure 7:
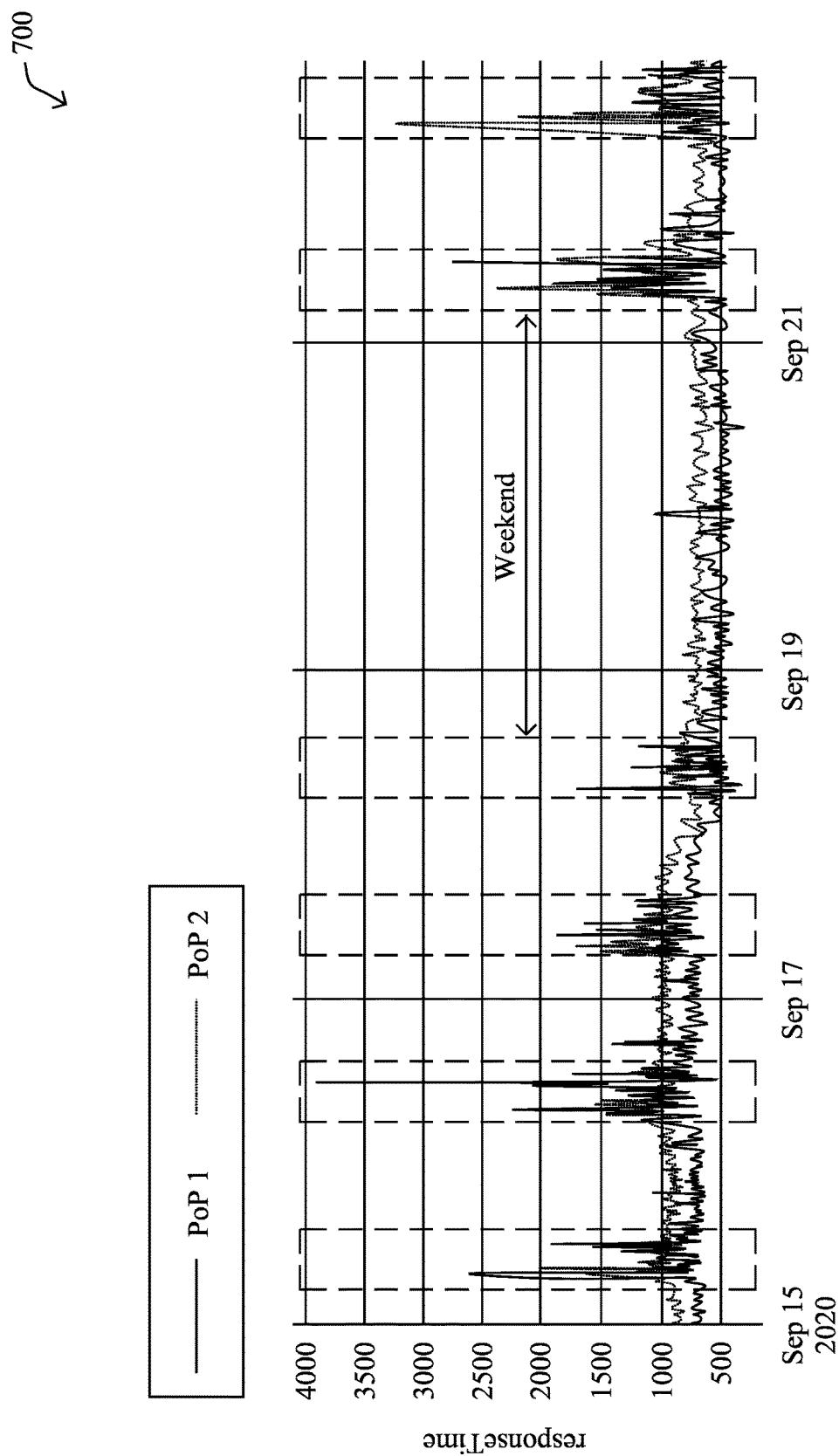
FIG. 7 illustrates an example plot of response times using different PoPs.

As an example of forecasting model, consider plot 700 in FIG. 7 of the response time associated with the use of two different SASE PoI's over time. As shown, there are periods of time during which the response time associated with the use of a particular PoP may not be acceptable for the application. Accordingly, a simple regression model (e.g., with per-hour features) can detect recurring failures occurring a few hours every weekday.

Referring again to FIG. 6, configuration manager 608 may be responsible for adjusting the configuration of performance monitor 602 based on previously produced forecasts from PoP violation forecaster 606 and their actual outcome. In various embodiments, configuration manager 608 may implement a series of rules, such:

If multiple patches were produced for a violation on PoP1, suggesting using PoP2, but redirecting the traffic to PoP2 still lead to a violation repeatedly, remove PoP2 from the list of PoPs eligible from the network device, and add a new PoP instead (e.g., PoP4). This can be useful for when the forecasts are over-estimating the capacity of the connectivity between the device and PoP2 due to the simplicity of the probes.

If there have not been violations for a network device and its current PoP, reduce the number of alternate PoPs for which probes are being collected, and reciprocally. This allows configuration manager 608 to dynamically adjust the amount of probing based on whether the network device is already seeing perfect SLAs or not.

Note that a routing patch/configuration change in configuration data 618 is not limited to the selection of a tunnel, in order to route traffic based on forecasts of potential to application SLA violation. Here, the destination of the tunnel (selected PoP) is conditioned by the forecast and traffic is sent to the most appropriate PoP. In another embodiment multiple tunnel may be configured terminating on different PoP and traffic forwarding is determined according to the forecast.

In various embodiments, another function of example 500 may be for predictive SASE process 248 to influence the return traffic from the PoP to the networking device. Indeed, a very critical challenge faced today in SASE architecture is the selection of the last mile leg from the PoP to the edge device. When the traffic reached a PoP towards the edge router, it is critically important to select the tunnel providing the guaranteed SLA for a given application. To that end, predictive SASE process 248 may notify the controller engine of the SASE provider, so as to provide a forecast for the best edge link to the edge device available from the various PoPs of the SASE provider. For instance, if there exists two tunnels T1 to PoP1 and T2 to PoP2 from an edge SASE device to the provider, the traffic coming from the provider to the edge will be routed onto the tunnel (T1 or T2 in this example) satisfying the SLA requirements for the application. A custom BGP policy is then specified allowing for setting the LOCAL-PREF BGP attribute to route the traffic from other BGP speaker to the BGP speaker corresponding to the PoP connecting to the best tunnel selected by predictive SASE process 248.

Figure 8:
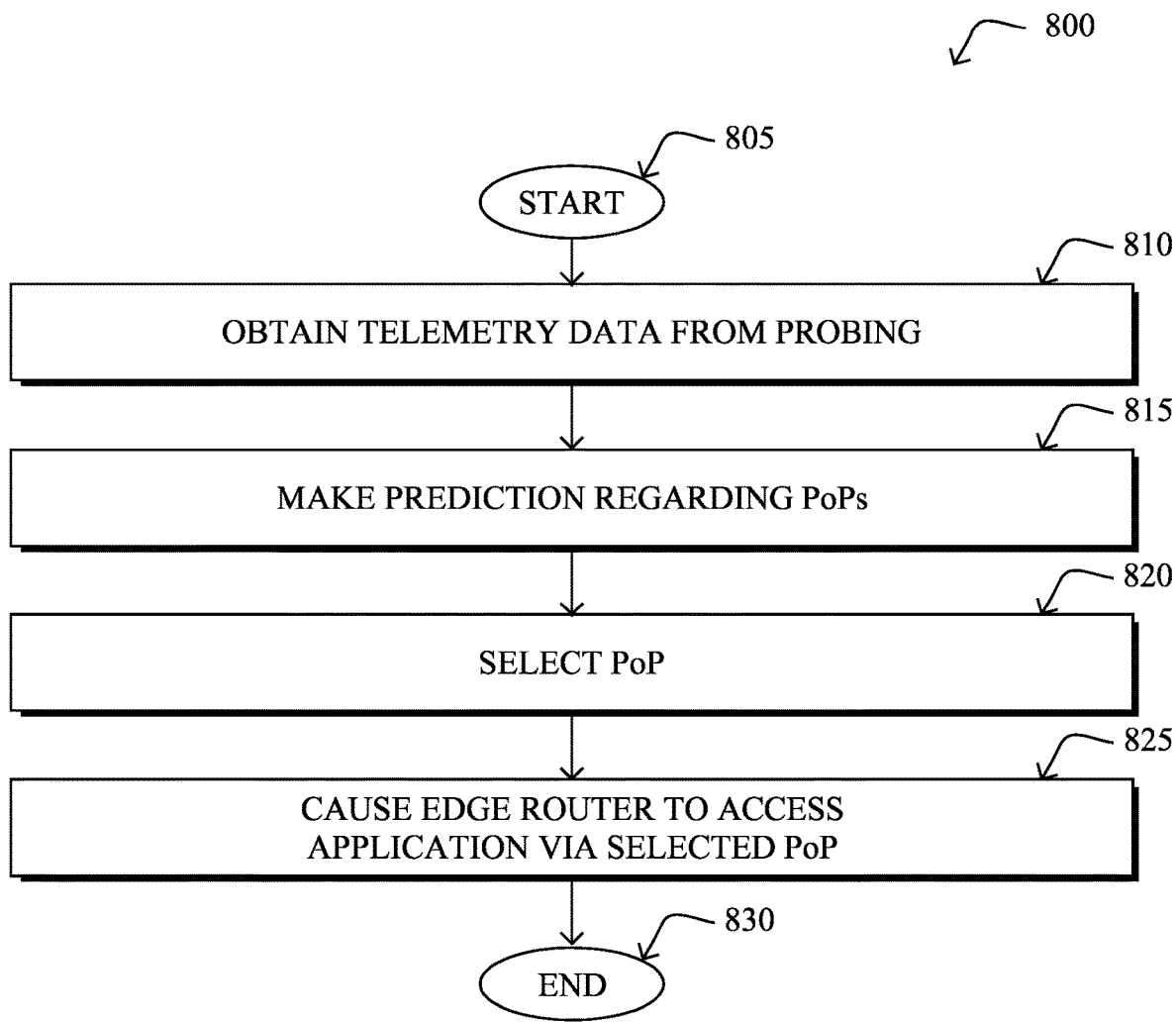
FIG. 8 illustrates an example simplified procedure selecting a PoP for use by an edge router.

FIG. 8 illustrates an example simplified procedure 800 for selecting a PoP for use by an edge router, in accordance with one or more embodiments described herein. For example, a non-generic, specifically configured device (e.g., device 200), such as controller for a network (e.g., an SDN controller or other device in communication therewith, a networking device, etc.), may perform procedure 800 by executing stored instructions (e.g., routing process 244 and/or predictive SASE process 248). The procedure 800 may start at step 805, and continues to step 810, where, as described in greater detail above, the device may obtain telemetry data that results from an edge router sending probes to a cloud-hosted application via a plurality of points of presence (PoPs). In some instances, the plurality of PoPs may be selected, at least initially, based on their geographic distances to the edge router, private information about PoP capacity, historical data, or other such criteria. In various embodiments, the probes may comprise HTTPS probes, SIP probes, or the like.

At step 815, as detailed above, the device may make, based on the telemetry data, is predictions as to whether use of each of the plurality of points of presence by the edge router to access the cloud-hosted application will result in a violation of a service level agreement (SLA). For instance, the device may use the telemetry data to generate a machine learning-based, predictive model that has been trained to predict whether application traffic sent via the edge router and a particular PoP will result in an SLA violation. In some embodiments, the device may also make the prediction in a more global manner by also leveraging telemetry data obtained from one or more other edge routers that also send probes to the cloud-hosted application via one or more of the plurality of points of presence.

At step 820, the device may select, based on the predictions, a PoP from among the plurality of PoPs that the edge router should use to access the cloud-hosted application during a time window, as described in greater detail above. For instance, assume that the plurality includes PoPs A, B, and C, and that the device predicts that the SLA of the application traffic will be violated during a certain time window, should that traffic be sent via PoPs B or C. In such a case, the device may select PoP A for use by the edge router during that time window.

At step 825, as detailed above, the device may cause the edge router to access the cloud-hosted application via the particular PoP during the time window. In further embodiments, the device may also cause the particular PoP to send traffic from the application to the edge router via a particular tunnel (e.g., a tunnel predicted not to violate the SLA, etc.). Depending on the results of the use of the particular PoP, the device may also take additional measures, such as adjusting the PoP based in part on the predictions (e.g., by removing from consideration PoPs that consistently are predicted to violate the SLA, etc.), causing the particular PoP to be ineligible for use by edge router to access the cloud-hosted application (e.g., based on a determination that the SLA was still violated, etc.). Procedure 800 then ends at step 830.

It should be noted that while certain steps within procedure 800 may be optional as described above, the steps shown in FIG. 8 are merely examples for illustration, and is certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the selection of the best PoP to use by an edge router to access a cloud-hosted application. By predicting whether use of a given PoP will result in an SLA violation, the application traffic can be moved dynamically between different PoPs, so as to ensure the best quality of experience of the application possible.

While there have been shown and described illustrative embodiments that provide for predictive SASE PoP selection, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, telemetry data that results from an edge router sending probes to a cloud-hosted application via a plurality of points of presence;
   making, by the device and based on the telemetry data, predictions as to whether use of each of the plurality of points of presence by the edge router to access the cloud-hosted application will result in a violation of a service level agreement;
   selecting, by the device and based on the predictions, a particular point of presence from among the plurality of points of presence that the edge router should use to access the cloud-hosted application during a time window;
   causing, by the device, the edge router to access the cloud-hosted application via the particular point of presence during the time window;

making, by the device, a determination that a violation of the service level agreement occurred while the edge router was accessing the cloud-hosted application via the particular point of presence; and causing, by the device and based in part on the determination, the particular point of presence to be ineligible to be used by the edge router to access the cloud-hosted application.

2. The method as in claim 1, wherein the plurality of points of presence are selected based on at least one of: their geographic distances to the edge router, data regarding their capacities, or their historical data.

3. The method as in claim 1, wherein the device makes the predictions based further in part on telemetry data obtained from one or more other edge routers that also send probes to the cloud-hosted application via one or more of the plurality of points of presence.

4. The method as in claim 1, further comprising:

causing, by the device, tunnels to be established between the edge router and the plurality of points of presence, prior to the edge router sending the probes to the cloud-hosted application.

5. The method as in claim 1, further comprising:

causing, by the device, the edge router to connect to the plurality of points of presence via a Hypertext Transfer Protocol Secure (HTTPS) proxy.

6. The method as in claim 1, further comprising:

causing, by the device, the particular point of presence to send traffic from the cloud-hosted application to the edge router via a particular tunnel.

7. The method as in claim 1, further comprising:

adjusting the plurality of points of presence, based in part on the predictions.

8. The method as in claim 1, wherein the probes comprise Session Initiation Protocol (SIP) probes.

9. The method as in claim 1, wherein the probes comprise Hypertext Transfer Protocol Secure (HTTPS) probes.

10. An apparatus, comprising:

one or more network interfaces;

a processor coupled to the one or more network interfaces and configured to execute one or more processes; and a memory configured to store a process that is executable by the processor, the process when executed configured to:

obtain telemetry data that results from an edge router sending probes to a cloud-hosted application via a plurality of points of presence;

make, based on the telemetry data, predictions as to whether use of each of the plurality of points of presence by the edge router to access the cloud-hosted application will result in a violation of a service level agreement;

select, based on the predictions, a particular point of presence from among the plurality of points of presence that the edge router should use to access the cloud-hosted application during a time window; and cause the edge router to access the cloud-hosted application via the particular point of presence during the time window;

make a determination that a violation of the service level agreement occurred while the edge router was accessing the cloud-hosted application via the particular point of presence; and cause, based in part on the determination, the particular point of presence to be ineligible to be used by the edge router to access the cloud-hosted application.

11. The apparatus as in claim 10, wherein the plurality of points of presence are selected based on at least one of: their geographic distances to the edge router, data regarding their capacities, or their historical data.

12. The apparatus as in claim 10, wherein the apparatus makes the predictions based further in part on telemetry data obtained from one or more other edge routers that also send probes to the cloud-hosted application via one or more of the plurality of points of presence.

13. The apparatus as in claim 10, wherein the process when executed is further configured to:

cause tunnels to be established between the edge router and the plurality of points of presence, prior to the edge router sending the probes to the cloud-hosted application.

14. The apparatus as in claim 10, wherein the process when executed is further configured to:

cause the edge router to connect to the plurality of points of presence via a Hypertext Transfer Protocol Secure (HTTPS) proxy.

15. The apparatus as in claim 10, wherein the process when executed is further configured to:

cause the particular point of presence to send traffic from the cloud-hosted application to the edge router via a particular tunnel.

16. The apparatus as in claim 10, wherein the process when executed is further configured to:

adjust the plurality of points of presence, based in part on the predictions.

17. The apparatus as in claim 10, wherein the probes comprise Session Initiation Protocol (SIP) or Hypertext Transfer Protocol Secure (HTTPS) probes.

18. A tangible, non-transitory, computer-readable medium storing program instructions that cause a device to execute a process comprising:

obtaining, by the device, telemetry data that results from an edge router sending probes to a cloud-hosted application via a plurality of points of presence;

making, by the device and based on the telemetry data, predictions as to whether use of each of the plurality of points of presence by the edge router to access the cloud-hosted application will result in a violation of a service level agreement;

selecting, by the device and based on the predictions, a particular point of presence from among the plurality of points of presence that the edge router should use to access the cloud-hosted application during a time window;

causing, by the device, the edge router to access the cloud-hosted application via the particular point of presence during the time window;

making, by the device, a determination that a violation of the service level agreement occurred while the edge router was accessing the cloud-hosted application via the particular point of presence; and causing, by the device and based in part on the determination, the particular point of presence to be ineligible to be used by the edge router to access the cloud-hosted application.

\* \* \* \* \*

UNITED STATES PATENT AND TRADEMARK OFFICE
CERTIFICATE OF CORRECTION

PATENT NO. : 11,539,673 B2
APPLICATION NO. : 17/308238
DATED : December 27, 2022
INVENTOR(S) : Jean-Philippe Vasseur et al.

It is certified that error appears in the above-identified patent and that said Letters Patent is hereby corrected as shown below:

In the Specification

Column 9, Line 40, please amend as shown:
proportion of them could be avoided (e.g., using an alternate Column 10, Line 28, please amend as shown:
(PoPs) around the world, and locations are usually connected Column 11, Line 40, please amend as shown:
sending probes to a cloud-hosted application via a plu- Column 12, Line 27, please amend as shown:
one).

Column 12, Line 49, please amend as shown:
In the simplest case, a regular IPsec tunnel can be estab- Column 13, Line 35, please amend as shown:
In this example, the SIP call is only running through POP1

Column 14, Line 4, please amend as shown:
associated with a particular entity (i.e., from other devices of Column 14, Line 11, please amend as shown:
For a given network device and PoP, features thus include Column 14, Line 27, please amend as shown:
different SASE PoPs over time. As shown , there are periods Column 14, Line 55, please amend as shown:

Signed and Sealed this
Twenty-eighth Day of March, 2023

Katherine Kelly Vidal
*Director of the United States Patent and Trademark Office*

CERTIFICATE OF CORRECTION (continued)
U.S. Pat. No. 11,539,673 B2 in order to route traffic based on forecasts of potential

Column 15, Line 36, please amend as shown:
based on the telemetry data, predictions as to whether use Column 16, Line 8, please amend as shown:
shown in FIG. 8 are merely examples for illustration, and In the Claims Column 17, Line 5, please amend as shown:
causing, by the device and based in part of the determi-